United States Patent [19]

Wilkinson et al.

[11] Patent Number: 4,469,928
[45] Date of Patent: Sep. 4, 1984

[54] TOP LOADING DETACHABLE STUD FEEDING ASSEMBLY

[75] Inventors: Harold C. Wilkinson, Medford; Alan W. Mkitarian, Palmyra; Vito P. Navarra, Voorhees; Francis J. Preston, Cinnaminson, all of N.J.

[73] Assignee: KSM Fastening Systems, Inc., Moorestown, N.J.

[21] Appl. No.: 387,338

[22] Filed: Jun. 11, 1982

[51] Int. Cl.³ .............................................. B23K 9/20
[52] U.S. Cl. ...................................................... 219/98
[58] Field of Search ..................................... 219/98, 99

[56] References Cited

U.S. PATENT DOCUMENTS 3,546,419 12/1970 Meyer ..................................... 219/98
3,792,223 2/1974 Spisak ..................................... 219/98
3,854,027 12/1974 Ettinger et al. ........................ 219/98

Primary Examiner—Roy N. Envall, Jr.
Assistant Examiner—C. M. Sigda
Attorney, Agent, or Firm—Duffield & Lehrer

[57] ABSTRACT

Improvements to stud welding equipment having automatic stud feeding apparatus. The stud receiving chamber and receiving chamber entrance are positioned for top loading of the studs being fed through a stud loading tube. The stud loading tube and attached stud feed tube are detachably connected to the stud welding gun by a stud block and disconnect assembly which includes a transversely movable slider which provides the dual function of providing the detachable interlock with the stud welding gun and blockage of the stud loading tube when the assembly is detached.

5 Claims, 6 Drawing Figures

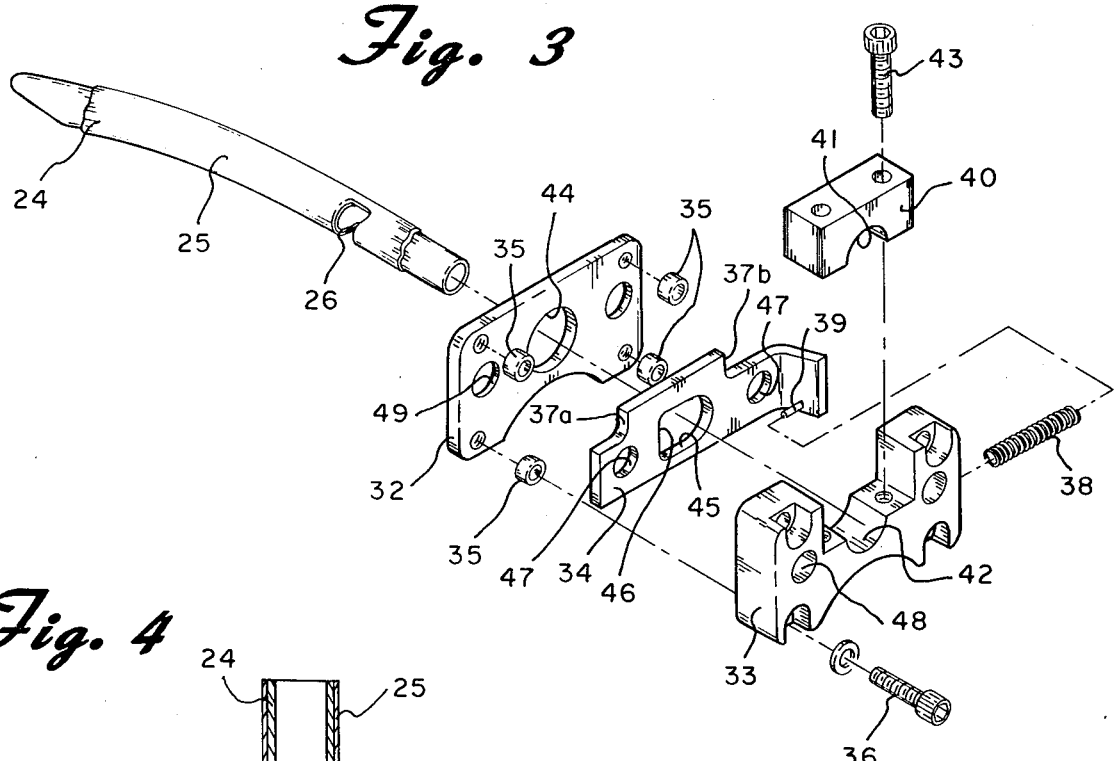
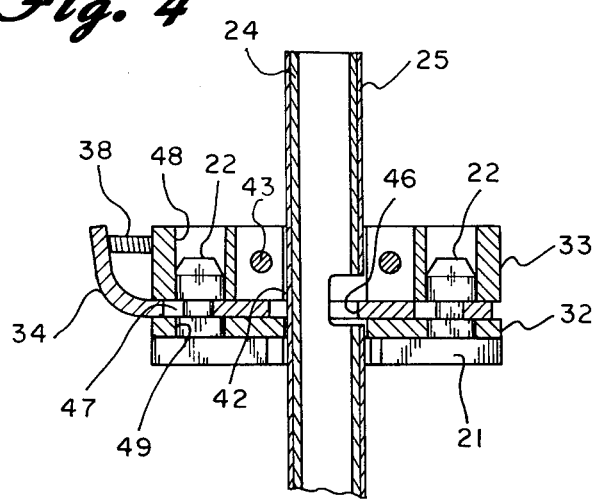
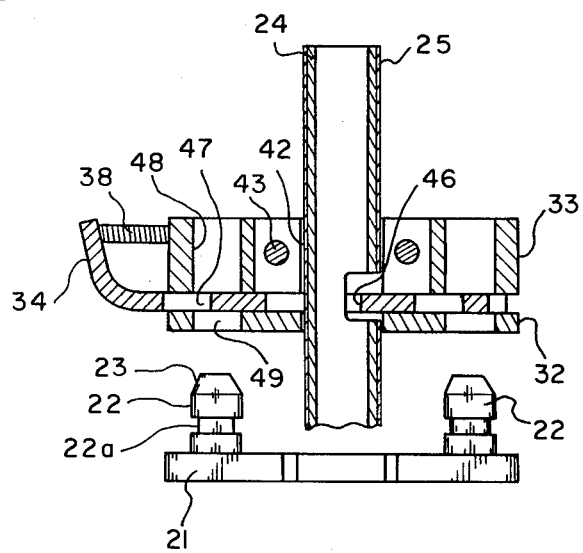
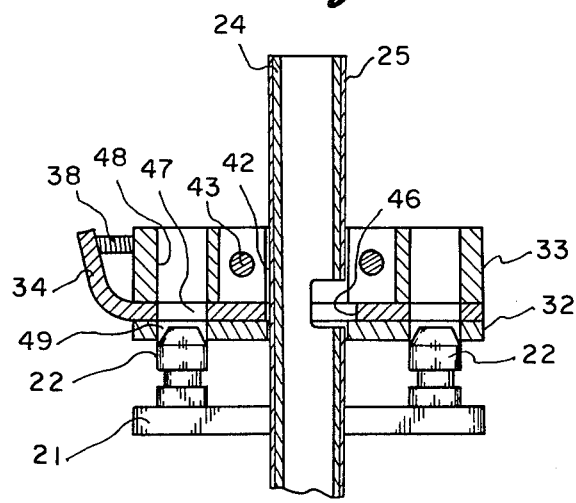

TOP LOADING DETACHABLE STUD FEEDING ASSEMBLY

BACKGROUND OF INVENTION

The present invention applies to stud welding guns and, more particularly, to improvements to stud welding guns utilizing automatic stud feeding equipment.

In the overall field of stud welding equipment, there is currently in use a general category of stud welding equipment consisting of hand held stud welding guns which utilize automatic stud feeding apparatus.

The overall components of such a system would be the hand held stud welding gun itself, an automatic stud chucking assembly carried by the stud welding gun and a stud loading assembly for delivering the studs to the automatic stud chucking assembly.

Positioned remote from the stud welding gun in such a system is the conventional stud welding power supply and controller which are electrically interconnected with the stud welding gun. Additionally, a stud orientator and stud feeder are utilized which feed the studs to the stud loading assembly by flexible feed tubes and also provide the pneumatic control for the stud chucking assembly.

The conventional stud chucking assembly is positioned on the front of the stud welding gun. The piston assembly is interconnected to the lift mechanism of the stud welding gun and includes a piston and piston rod. Interconnected to the end of the piston assembly is a stud receiving chamber which has a receiving chamber entrance through which studs to be loaded pass. The stud receiving chamber in conventional automatic feed stud welding guns is in the bottom or underneath the side of the stud receiving chamber and receives the studs in a slightly inclined vertically upward direction. Lastly, a conventional stud chuck is positioned on the opposite end of the stud receiving chamber.

The conventional stud loading assembly is positioned beneath the stud receiving chamber and is supported either upon the leg assembly of the stud welding gun or the stud receiving chamber itself. The stud loading assembly includes a stud loading tube, one end of which is connected to the stud feed tube and the other end which arcs upwardly into communication with the receiving chamber entrance of the stud receiving chamber. The stud loading assembly is secured to the stud welding gun by conventional threaded fasteners or other semi-permanent devices and is not readily detachable.

The conventional automatic stud welding equipment, in operation, will pneumatically dispatch a stud through the stud feed tube into the stud loading tube whereupon the stud is blown upwardly into the stud receiving chamber via the receiving chamber entrance. The stud is held in the stud receiving chamber by the air pressure blowing against the stud. Thereafter, the piston assembly is operated and the stud is pushed through the stud receiving chamber by the piston rod into the chuck preparatory to welding.

A typical use of such automatic stud welding equipment would be in welding heat transfer boiler tube studs inside of boilers and the like. In such applications, speed of operation is critical in that literally thousands of studs of identical configuration need be welded. The welding angle may be any angle from vertically downward, vertically overhead to any angle in between.

One of the problems that is being encountered in such conventional automatic stud welding equipment is that the stud, upon reaching the stud receiving chamber, will fall partially by gravity back out of the receiving chamber with a resultant jam occurring as the piston moves forward. This problem is more prevalent when the stud welding gun is held generally in the horizontal plane or side hand welding since gravity has a greater effect upon the stud at that position.

There are also problems encountered with the studs jamming in the stud loading tube prior to entrance into the stud receiving chamber and even in the stud feed tube.

Whenever a jam occurs, it is necessary in the conventional equipment to loosen the threaded fasteners and retract the stud loading tube from the assembly. Thereafter, the jam can be cleared and the stud loading tube reassembled into the stud loading assembly.

In clearing such jams after the stud loading tube is removed, it is common practice to cycle the stud welding gun through one or more cycles to confirm the operation of the gun. While the cycling is occurring, further studs are being fed through the stud feed tube and the stud loading tube. Inasmuch as the stud loading tube is disengaged from the stud feed assembly, a dangerous condition exists in that there is no restriction to the discharge of the studs from the stud loading tube by the pneumatic pressure. The discharge of the studs from the stud loading tube is at a rather high velocity and the studs become a dangerous projectile if proper care is not observed.

In summary, the conventional automatic stud welding equipment with the bottom feeding of studs to the stud receiving chamber provides a condition where gravity effect upon the studs can result in less reliable operation due to stud jamming. Further, the conventional equipment requires considerable time to disassemble and reassemble the stud loading tube from the stud loading assembly to clear a jam. Lastly, the conventional equipment provides a dangerous situation in that there is no safety to prevent discharge of the studs from the stud loading tube while the stud loading tube is disassembled and the stud welding gun is being cycled to clear the jam.

SUMMARY OF INVENTION

The present invention provides improvements to the conventional automatic stud welding equipment to overcome the disadvantages and problems discussed above.

In accordance with the present invention, the stud receiving chamber and receiving chamber entrance are orientated such that the studs are fed into the stud receiving chamber vertically downwardly into the receiving chamber rather than upwardly. In this manner, gravity aids in the retention of the stud within the receiving chamber rather than distracting from such retention.

In accordance with the present invention, the stud loading assembly including the stud loading tube to which the studs are discharged is likewise positioned on top of the stud welding gun rather than beneath. In this fashion, studs being discharged through the stud feed tube and into the stud loading tube likewise are aided by gravity in feeding of the stud into the stud receiving chamber.

The stud loading assembly utilizes a stud block and disconnect assembly which provides the dual function of the supporting and detachably connecting the stud loading tube to the stud welding gun as well as to provide a block against discharge of studs through the stud loading tube when the assembly is detached.

The stud block disconnect assembly includes a slide which has two apertures within the slide. The slide is spring loaded and slides between a slide retainer plate and a loading tube clamp plate. The apertures of the slide cooperate with retaining lugs on a load tube faceplate assembly secured to the stud welding gun such that when the slide is actuated, the apertures of the slide will engage or disengage annular grooves in the retaining lugs to either lock or unlock the stud block disconnect assembly from the stud welding gun.

The slide also includes a further aperture therein through which the stud loading tube passes. A stud blocking slot formed in the side of the stud loading tube cooperates with a side wall of the aperture in the slide through which the stud loading tube passes such that, when the assembly is disengaged and the slide moved to a first position under the spring pressure, the side wall of the aperture will partially block the stud loading tube in this position but will be clear of the stud loading tube when the assembly is in engaged position whereupon the slide is in a second position.

In this manner, the stud loading assembly may be quickly disconnected and reconnected to clear any possible jam. Additionally, while disconnected, protection is provided against the accidental discharge of studs from the stud loading tube.

Other advantages of the present invention will be apparent to those skilled in the art from the detailed description thereof taken in conjunction with the drawings which follows.

DESCRIPTION OF DRAWINGS

FIG. 3 is an exploded perspective view of the stud loading tube and stud block and disconnect assembly of the present invention;

FIG. 4 is a top sectional view of the stud block and disconnect assembly in engaged position;

FIG. 5 is a top sectional view of the stud block and disconnect assembly during engagement with the stud welding gun; and FIG. 6 is a top sectional view of the stud block and disconnect assembly in stud blocking position.

DETAILED DESCRIPTION OF INVENTION

Figure 1:
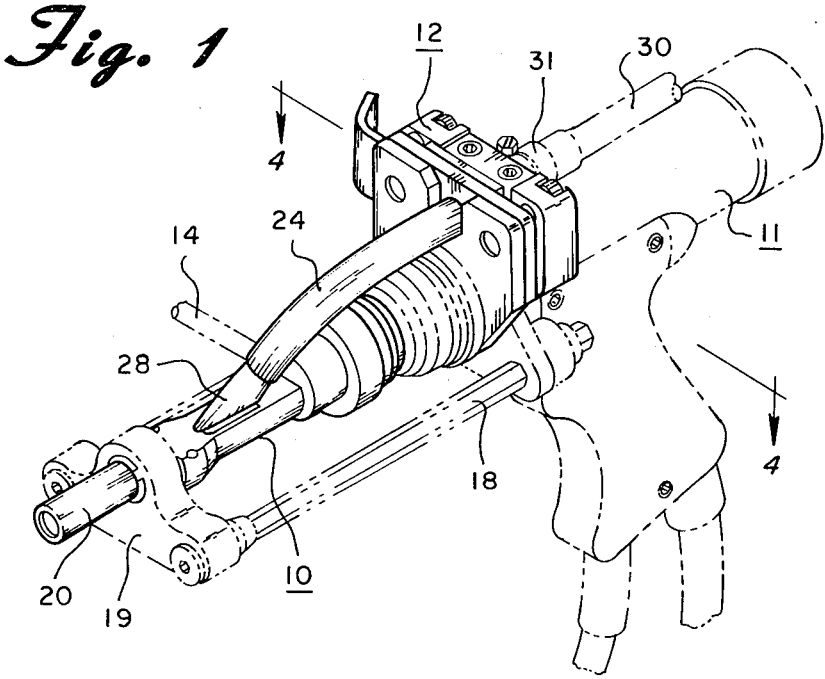
FIG. 1 is a perspective view of the stud welding equipment of the present invention with the stud loading assembly in engaged position.
Figure 2:
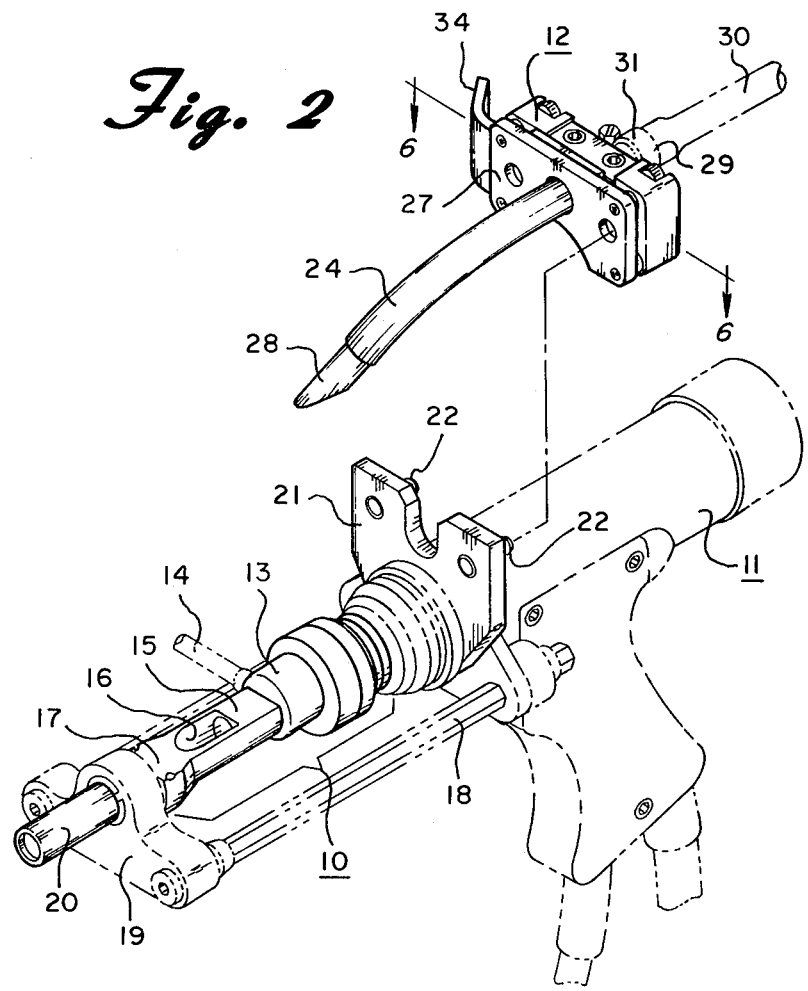
FIG. 2 is a perspective view of the stud welding equipment of the present invention with the stud loading assembly in disengaged position.

The automatic stud welding equipment of the present invention including the stud chucking assembly and stud loading assembly is shown in FIG. 1 in assembled relationship one to another and in FIG. 2 wherein the stud loading assembly is disassembled from the stud welding gun and stud chucking assembly.

Refer more particularly to FIGS. 1 and 2, the stud chucking assembly 10 is secured to the front end of the stud welding gun 11. In a like manner, the stud loading assembly 12 is secured to the stud welding gun above the stud chucking assembly.

The stud chucking assembly 10 includes a piston assembly 13 secured to the front of the stud welding gun 11. The piston assembly utilizes a conventional piston (not shown) operated by means of an appropriate air hose 14. The piston carries a piston rod (not shown) which traverses into and out of the stud receiving chamber 15 under control of the stud feeding apparatus.

The stud receiving chamber 15 is secured at one end to the piston assembly 13. The stud receiving chamber 15 includes a receiving chamber entrance 16, the open end of which is positioned upwardly facing. In this manner, studs delivered to the stud receiving chamber are delivered in an inclined downwardly direction under the influence of gravity.

The opposite end of the stud receiving chamber 15 terminates in a chuck adapter 17. A conventional stud chuck (not shown) is secured to the chuck adapter 17.

The stud welding gun includes a leg assembly 18. A footpiece 19 is secured to the leg assembly 18. An arc shield retainer 20 is likewise carried by the footpiece 19.

In operation, following a welding cycle, the piston assembly and piston rod are withdrawn from the stud receiving chamber 15. As to be described in more detail hereinafter, a stud is delivered to the stud receiving chamber 15 via the receiving chamber entrance 16. Thereafter, in accordance with the welding cycle, the piston and piston rod advances moving the stud through the stud receiving chamber 15 and chuck adapter 17 into the chuck positioned within the arc shield 20. Welding of the stud occurs in the normal stud welding cycle whereupon the piston and piston rod are again retracted from the stud receiving chamber 15.

The details of the stud loading assembly 12 are shown in FIGS. 3–6. The stud loading assembly 12 includes a load tube faceplate assembly 21 which is secured to the stud welding gun back of the piston assembly 13. The faceplate assembly 21 includes two retaining lugs 22 secured to the faceplate assembly 21 and facing rearwardly of the stud welding gun.

Each retaining lug 22 is of cylindrical configuration and includes a tapered insertion face 23 which aids in assembly of the apparatus as to be described in more detail hereinafter. Additionally, each retaining lug 22 includes an annular recess 22a which provides the interlock of the apparatus as to be described in more detail hereinafter.

Referring to FIG. 3, the stud loading assembly 12 includes a stud loading tube 24. The stud loading tube 24 is surrounded by a shrink tube insulation covering 25. Additionally, the stud loading tube 24 includes a stud blocking slot 26 cut through the wall of the stud loading tube and the insulation covering.

The stud loading tube 24, as may be seen in FIGS. 1 and 2, is secured within and supported by a stud block and disconnect assembly 27. When the stud block and disconnect assembly 27 is secured in place to the load tube face plate assembly 21, as shown in FIG. 1, the discharge end 28 of the stud loading tube 24 is positioned in communication with and slightly above the stud receiving chamber 15. The opposite end 29 of the stud loading tube 24 extends from the rear of the stud block and disconnect assembly 27 and is secured to a stud feed tube 30 by means of a hose clamp 31. During operation, studs are fed through the stud feed tube 30 and the stud loading tube 24 to the stud receiving chamber 15.

The details of the stud block and disconnect assembly 27 are shown in FIG. 3. The stud block and disconnect assembly includes a slide retainer plate 32 and a load tube clamping plate 33. A slide 34 is positioned between the slide retainer plate 32 and load tube clamp plate 33.

In assembled relation, four spacers 35 between the slide retainer plate 32 and load tube clamp plate 33 working in conjunction with four cap screws 36 secure the slide retainer plate 32 and load tube clamp plate 33 to one another but spaced in order that the slide 34 may move transversely of the slide retainer plate 32 as controlled by slide limit notches 37a and 37b.

A compression spring 38 is provided to urge the slide to the right-hand position as seen in FIG. 3. The spring 38 is held in place, at one end, by a dowel pin 39 in the slide 34 and by a recess (not shown) in the loading tube clamp plate 38 into which the opposite end of the spring fits.

The stud loading tube 24 is held in place in the stud block and disconnect assembly 27 by means of a loading tube clamp 40. The loading tube clamp 40 has a clamp face 41 which cooperates with a clamp face 42 of the loading tube clamp plate 33. The loading tube clamp 40 is designed to engage the rear portion of the stud loading tube 24 and is secured in place by two cap screws 43.

When in assembled relation, the stud loading tube 24 passes through an aperture 44 in the slide retainer plate 32. In a like manner, the stud loading tube 24 passes through an aperture 45 in the slide 34. The shrink tube insulation covering 25 around the stud loading tube 24 insulates the stud block and disconnect assembly 27 from the stud loading tube 24. This insulation is required in the unlikely event that electrical interconnection is made between the stud loading tube 24 and the stud receiving chamber 15 which is energized during the welding operation.

The slide 34, as a part of aperture 45, includes a blocking wall 46. The blocking wall 46, as will be shown in more detail hereinafter, cooperates with the stud blocking slot 26 of the stud loading tube 24 to block the stud loading tube 24 when the stud loading assembly is disconnected from the stud welding gun.

The slide 34 also includes two locking apertures 47 at either end of the slide. The locking apertures 47, as to be described in more detail hereinafter, cooperate with the retaining lugs 22 to provide interlock of the stud block and disconnect assembly 27 with the stud welding gun 11.

Shown in FIGS. 4-6 is the stud block and disconnect assembly 27 in interlocked position, in the process of interlock or disengagement and when disengaged from the load tube face assembly 21 respectively.

Referring first to FIG. 5, there is illustrated the relative relationship of the slide 34, locking apertures 47 and the retaining lugs 22 during engagement and disengagement of the stud block and disconnect assembly 27 with the load tube face plate assembly 21. The slide 34 is moved transversely against the spring 38 to a point wherein the locking apertures 47 align with lug apertures 48 and 49 within the loading tube clamp plate 33 and slide retainer plate 32 respectively. The insertion face 23 of the retaining lugs 22 aids in guiding of the retaining lugs within the respective apertures.

Turning now to FIG. 4, the stud block and disconnect assembly 27 is pushed upon the retaining lugs 22 until the loading tube clamp plate 33 engages the load tube face plate assembly 21. At this point, pressure is released from the slide 34 and the spring 38 urges the slide in a left-hand direction looking at FIG. 4. The slide moves transversely until the side wall of the locking apertures 47 engage the annular recesses 22a of each retaining lug 22 whereupon the stud block and disconnect assembly 27 is interlocked with the load tube face plate assembly and secured in place. In this position, the blocking wall 46 of the slide 34 is clear of the stud blocking slot 26.

Shown in FIG. 6 is the relationship of the slider relative to the stud loading tube 24 when the stud block and disconnect assembly 27 is disconnected from the load tube face plate assembly 21. In this position, the slider 24 is urged to the left as shown in FIG. 6 until the slide limit notch 37b engages a spacer 35. In this position, the blocking wall 46 of the slide 34 partially blocks the stud loading tube 24. In this manner, a stud being discharged through the stud feed tube 30 will not be permitted to pass from the stud loading tube 24 while the stud block and disconnect assembly 27 is disengaged and the stud welding equipment being cycled.

From the foregoing, it will be appreciated that the stud welding equipment of the present invention provides a stud chucking assembly which has an upturned stud receiving chamber for top loading of studs. This provides the definite advantage of gravity assisting in loading of the studs rather than working against such during most normal angulation and utilization of the stud welding gun.

The automatic stud welding equipment of the present invention further provides a quick and efficient means for disconnecting of the stud loading assembly from the stud welding gun to facilitate in clearing of any blockage. Additionally, while the stud loading assembly is disconnected, accidental discharge of studs from the stud loading tube is eliminated.

The automatic stud welding equipment of the present invention has been described in respect to the particular embodiment thereof shown in the drawings and described in the specification. However, in view of the foregoing disclosure, other modifications and variations of the invention will become apparent to those skilled in the art and therefore, no limitation as to the scope of the invention is intended by the particular embodiments described in the specification and shown in the drawings but the scope thereof is to be interpreted in view of the appended claims.

What is claimed is:

1. In automatic stud welding equipment of the type employing a stud welding gun, an automatic stud chucking assembly and a stud loading assembly for delivering a stud to the stud chucking assembly, the improvements in the stud loading assembly providing for quick disconnection of the stud loading assembly from the stud welding gun and stud blockage comprising:
    a stud loading tube through which studs to be loaded pass, one end of which is in communication with the stud chucking assembly and the opposite end of which is interconnected with a stud feed tube; and
    a stud block and disconnect means disengagingly connected to the stud welding gun and supporting the stud loading tube in place wherein the stud block and disconnect means includes loading tube blocking means preventing movement of a stud through the stud loading tube when the stud block and disconnect means is disconnected from the stud welding gun.

2. The improvements of claim 1 wherein the loading tube blocking means includes a slide which moves transversely to the stud loading tube to partially block the stud loading tube.

3. The improvements of claim 1 wherein the stud block and disengagement means includes a slide which disengagingly interlocks the stud block and disconnect means to the stud welding gun.

4. The improvements of claim 3 wherein the slide further moves transversely to the stud loading tube to partially block the stud loading tube.

5. The improvements of claim 4 wherein the slide operates to clear blockage of the stud feed tube when interlocked with the stud welding gun and to block the stud loading tube when disengaged.

* * * * *